Sept. 24, 1957
G. O. DEAN
2,807,515
TOILET CASE
Filed Aug. 12, 1955
3 Sheets-Sheet 1
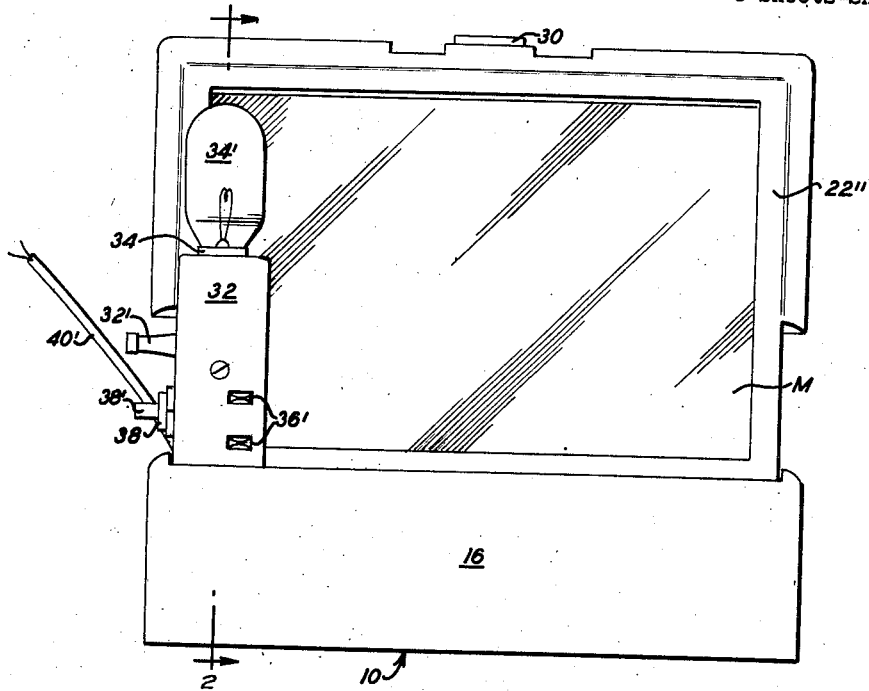
FIG. 1
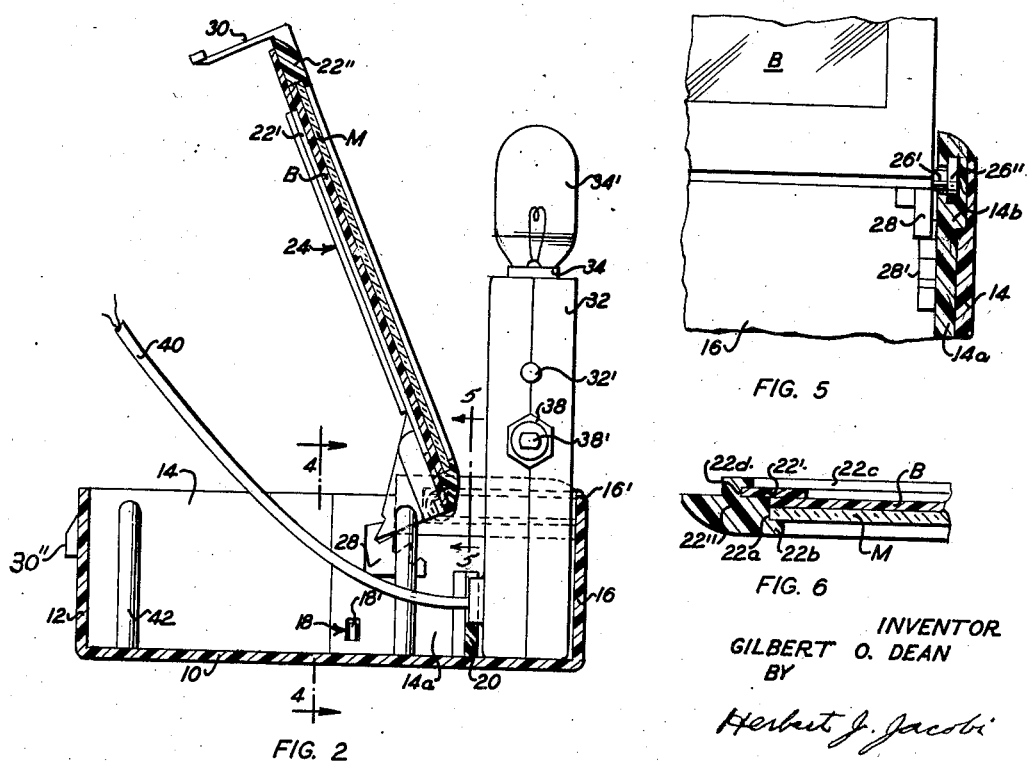
FIG. 2
FIG. 5
FIG. 6
INVENTOR
GILBERT O. DEAN
BY
Herbert J. Jacobi
ATTORNEY Sept. 24, 1957 G. O. DEAN 2,807,515
TOILET CASE
Filed Aug. 12, 1955 3 Sheets-Sheet 2

INVENTOR
GILBERT O. DEAN
BY
Herbert J. Jacobi
ATTORNEY

Sept. 24, 1957    G. O. DEAN    2,807,515
TOILET CASE
Filed Aug. 12, 1955    3 Sheets-Sheet 3

INVENTOR
GILBERT O. DEAN
BY *Herbert J. Jacobi*
ATTORNEY

United States Patent Office 2,807,515
Patented Sept. 24, 1957

2,807,515

TOILET CASE

Gilbert O. Dean, Little Rock, Ark.

Application August 12, 1955, Serial No. 527,948

3 Claims. (Cl. 312—227)

The invention relates to improvements in toilet cases, and has for an object to provide such a case which is of a comparatively light weight plastic construction, complete with adjustable mirror and electric illumination, and attractive in appearance; the parts thereof being formed by injection molding of the plastic material employed in its formation.

Another object of the invention is to provide a novel form of a sliding and hinge mounting for the lid of the case, by means of which the lid, having a mirror mounted on a side thereof is to be raised into an upwardly inclined position relative to the body of the case, and cooperative means for effecting adjustment of the angle of inclination of the lid as may be necessary for a proper viewing of the mirror.

A further object of the invention is to provide the case with an electric lighting unit which is normally housed within the body of the case and adapted to be raised from a prone position relative to the mirror, after the lid has been moved into the required inclined position; the unit being movable relative to the mirror to position the light element where its illumination is most effective.

Generally, the invention comprises a rectangular body having an open top and its interior divided by a transversely extending partition to provide a main compartment to house desired toilet articles and a second smaller compartment to house the electric lighting unit when it is not in use; a lid having a mirror mounted on its upper or outer side and attached to the side walls of the body by the aforesaid sliding and hinge mounting, the aforesaid cooperative means carried by the lid and the side walls of the body to allow adjustment of the angular inclination of the lid when it is raised relative to the body, and a latching means to retain the lid closed on the open top of the body.

Figure 3:
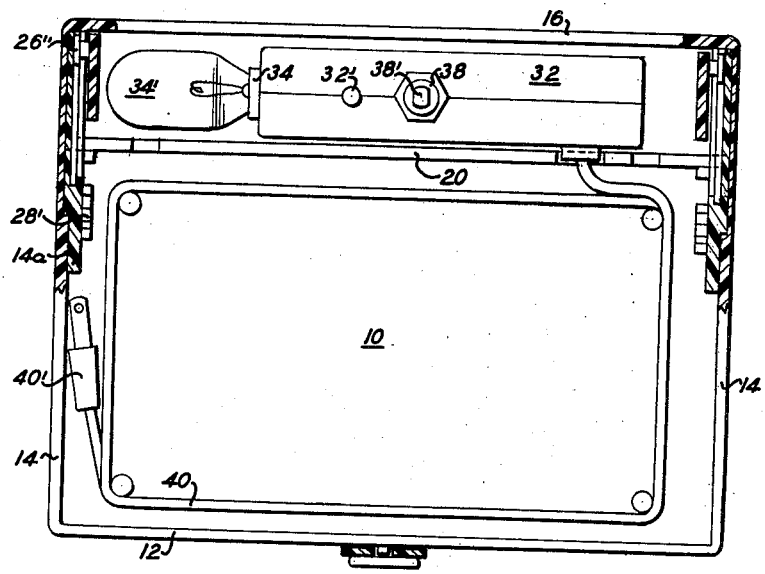
Figure 4:
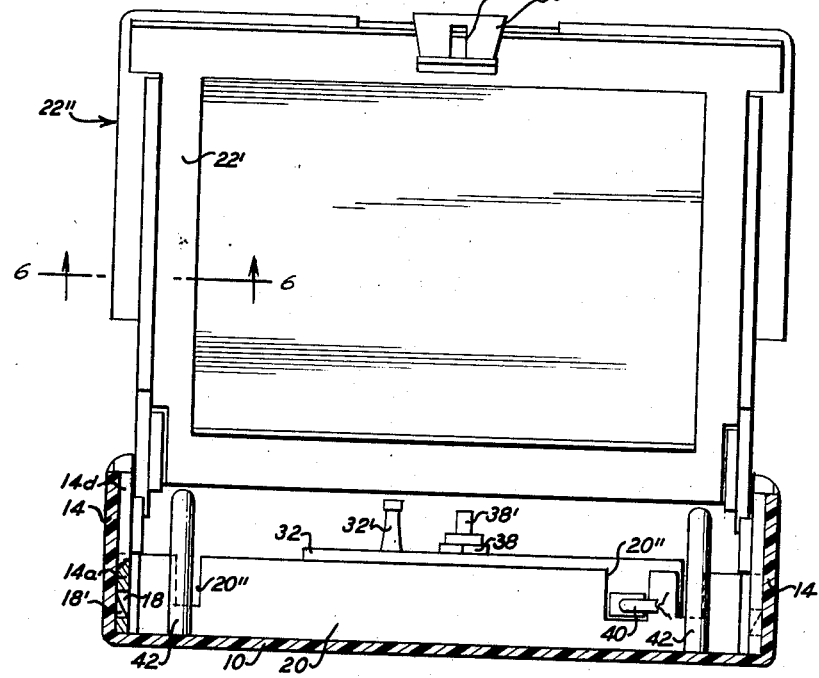
Figure 7:
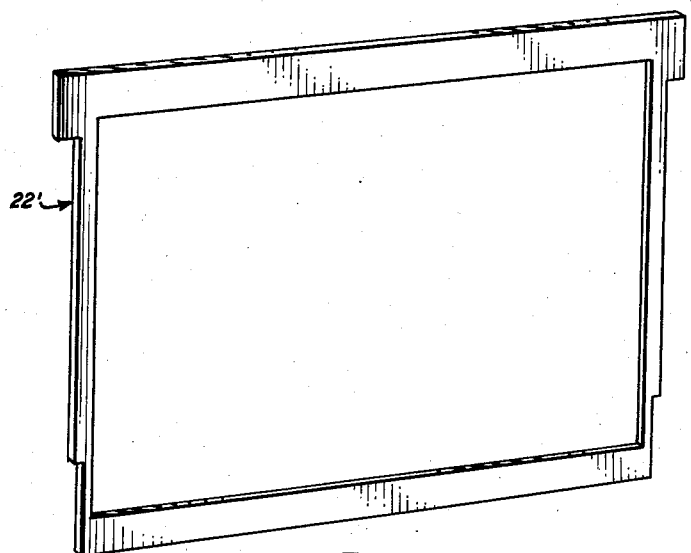

Further objects and advantages of the invention will be apparent from the following description taken in conjunction with the accompanying drawing wherein:

Fig. 1 is a front side elevation of the improved toilet case in accordance with the invention, the lid and the electric lighting unit being in raised positions;

Fig. 2, a vertical transverse section taken on the line 2—2 of Fig. 1, looking in the direction of the arrows;

Fig. 3, a top plan view partly in section of the body with the lid removed to show the compartmented interior of the body, the electrical lighting unit lying prone within the smaller compartment, the vertical posts spaced apart within the larger compartment for the training of the conductor cord for the lighting unit about the same when it is not in use, and the guide channels for the sliding and hinge mounting of the lid;

Fig. 4, a vertical longitudinal section taken on the line 4—4 of Fig. 2, looking in the direction of the arrows, the electric lighting unit being housed within the smaller compartment;

Fig. 5, an enlarged, fragmentary vertical section taken on the line 5—5 of Fig. 2, looking in the direction of the arrows;

Fig. 6, an enlarged fragmentary longitudinal section taken on the line 6—6 of Fig. 4, looking in the direction of the arrows:

Fig. 7, a perspective view of the lower or inner side of the lid with the top or outer part of the frame removed to show the conformation of the lower or inner frame part between which, the top or outer frame part, the edges of the mirror and its backing element are secured.

Figures 8, 9:
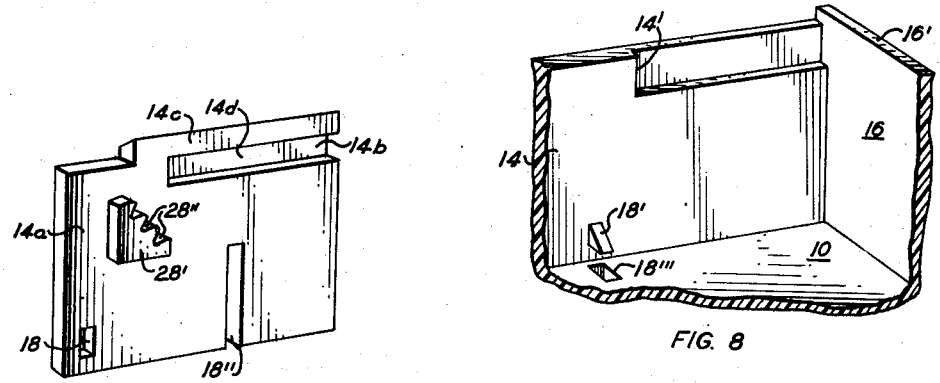
Figure 10:
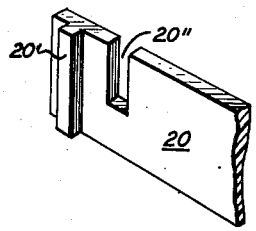
Figure 11:
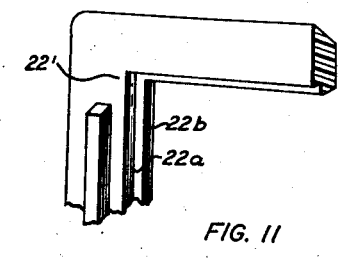

Fig. 8, an enlarged fragmentary vertical sectional view of the inner side of a rear corner portion of the body of the case and showing the horizontally elongated recess in the inner side of the side wall to receive the offset portion formed on the outer side of a supplemental side wall part;

Fig. 9, a perspective view of one of the supplemental side wall parts and showing the guide channel formation to receive one of the sliding and hinge mountings for the lid and the angled ratchet element molded on the inner side of the wall part for cooperation with a ratchet element or tooth carried by the lid;

Fig. 10, a perspective view, partly in section of an end portion of the partition for dividing the interior of the body of the case into compartments; and Fig. 11, a perspective view, partly in section of a corner portion of the top or outer part of the lid formation frame.

Referring to the drawings the embodiment of the invention, as illustrated therein, comprises a box-like body preferably rectangular in form, having a bottom wall 10, a front wall 12, side walls 14, a back wall 16 and an open top; the inner side of each of the side walls 14 being provided with a horizontally elongated recess 14' which opens through the top edge of the side wall and extends inwardly from the back wall 16, the top edges of the latter projecting slightly above the top edges of the side walls 14.

Positioned against the inner side of each of the side walls 14, is a supplemental side wall part 14a which is formed with an outwardly offset portion 14b of an area to snugly fit in the recess 14' when the part 14a is abutted against the side wall 14. The top of the offset portion 14b is level with the top edge of the back wall 16 and is outwardly thickened, as at 14c, to overlie the top edge of the portion of each of the side walls 14, forming the outer wall of the recess 14'; the thickened portion 14c having its outer edge upwardly and inwardly curved, substantially as shown in Figures 5 and 9. Opening through the inner side of each of the side wall parts 14a is the slotted mouth of a channel 14d which extends in line with the offset portion 14b and opens through the rear end edge thereof, but is closed by the back wall 16 when the side wall part 14a is in place.

These side wall parts 14a are of a lesser length than that of the side walls 14 and are each provided with an opening 18 adjacent its forward lower corner to engage with a projection 18' of substantially triangular form molded on the inner side of each of the side walls 14 to aid in the placing of the wall parts 14a in the required abutting relation with respect to the latter. Each of these wall parts 14a is also provided with a vertical slot 18" which opens through the lower edge thereof and is spaced inwardly from the back wall 16 a distance substantially one-third of the length of the wall part.

A partition member 20 may either be molded integrally with the side wall 14 and bottom wall 10 in spaced relation to the back wall 16, or may be provided as a separate substantially rigid member.

In either case, the side wall parts 14a are assembled in place by positioning the same in engagement with the inner surface of side walls 14 and with the ends of the partition member 20 received in the slots 18" in the side wall parts 14a. Such parts are then moved downwardly and the lower forward corner portion of each part engages the inclined upper surface of the lug 18' to move these portions inwardly until the lug 18' snaps into the opening 18. This prevents upward movement of the side wall posts 14a but the same may be removed by prying the lower forward corner portions inwardly to disengage the lugs 18' from the openings 18.

The side wall parts 14a are held in engagement with the inner surfaces of the side walls 14 by vertically disposed ribs 20' provided on the partition member 20 in spaced relation to each end thereof. The partition member 20 serves to divide the interior of the body into a relatively large front compartment and a smaller rear compartment.

The lid for closing the open top of the body of the case comprises an open two-part frame, the lower or inner part of which, indicated at 22' is flat and relatively thin, while the top or outer part, indicated at 22", is substantially thicker and of a somewhat greater area with the front portion and forward end portions of the side portions having a greater width than that of the rear back and side portions thereof, as is best shown in Figs. 1 and 4. The inner ends of the forward widened portions of the frame part 22" abut the forward ends of the portions 14c of the offset portions 14b at the tops of the side wall parts 14a so that the outer edges of the widened portions will match up with those of the portions 14c and be flush with the outer sides of the vertical walls of the case body when the lid is closed on the latter. The edges of the opening of the frame part 22' are rabbeted, as at 22a, to receive the edges of a mirror M and a backing element or sheet B and seat the same against the bordering flange 22b; the reflecting surface of the mirror being exposed through the opening at the top side of the frame part. The lower or inner side of the frame part 22" is formed with a relatively narrow thickened portion 22c extending parallel to and in slightly spaced relation from the rabbeted edge of the frame opening and has its inner edge grooved, as at 22d, to receive the edge portions of the frame part 22', as best shown in Fig. 6, the frame part 22' being sufficiently flexible so that its edges can be snapped into engagement with the groove 22d, after the mirror M and the backing element B are put in place. Disposed along the under side of the side portions of the lid frame and extending parallel to the outer edges thereof, are ribs 24 to abut the top edge portions of the side walls 14 of the case body, for the purpose of centering the lid with respect thereto when it is in closed position, in which position the rear side edge of the lid frame abuts against the top edge of the back wall 16.

The sliding and hinge mounting for the lid comprises a relatively short cylindrical element 26', having a circular head or roller 26" at its free end projecting laterally from the opposite ends of the rear side portion of the frame of the lid for engagement with the slotted channels 14d of the side wall parts 14a; the headed elements being inserted inwardly of the open ends of the slots and channels prior to the placing of the wall parts 14a in position against the inner sides of the side walls 14 of the case body. By this arrangement, the lid is to be slid in a forward direction until the headed elements reach the forward ends of the slots and channels and thereafter, swung upwardly into a forwardly inclined state, so as to set the mirror M in a desired angular position for use for shaving or other facial treatments. When the lid is so disposed, the rear side edge of the lid frame has moved away from the back wall 16 of the case body to a position substantially aligned with the partition 20, so that the smaller of the compartments is uncovered, as is also the larger compartment, due to the upwardly inclined position of the lid.

In order to retain the lid in any one of several inclined positions, a ratchet tooth 28 is formed at each end of the rear side edge of the lid frame inwardly from the headed elements for cooperation with a ratchet member 28' of substantially triangular form molded on the inner side of each of the side wall parts 14a, the member 28' having an outwardly and upwardly inclined edge provided with a series of ratchet teeth 28" to be selectively engaged by the tooth 28.

Mounted centrally on the edge of the front side of the lid frame is a resilient tongue 30 of substantially hasp-like form, it having a slot 30' for snapped engagement over a lug 30", formed on the outer side of the front wall 12 of the case body to secure the lid in closed position on the latter.

Housed within the smaller of the compartments is a standard 32 having a socket 34 embedded in its top end to receive an electric lamp bulb 34' and a plug outlet 36, together with a toggle switch 38 embedded in the same below the socket 34, all in electrical connection with each other and with a conductor cord 40 leading outwardly through a side of the lower end portion of the standard; the plug outlet 36 having its resilient contacts 36' exposed through a side of the standard, other than the side through which the finger grip 38' of the toggle switch 38 projects. A hand grip 32' projects from the standard 32, above the finger grip 38' for use in raising the standard from its normally prone position within the smaller compartments into vertical position. The free end of the conductor cord 40 is provided with a plug connector 40' for engagement with an outlet, not shown, of an electric current source. In its upright position, the standard 32 can be moved along the smaller compartment to dispose the lamp 34' relative to the mirror M for desired illuminating effect.

Rising from the bottom wall 10 within the larger compartment is a series of posts 42, four in number, as shown, which it having a slot 30' for snapped engagement over a lug 30", formed on the outer side of the front wall 12 of the case body to secure the lid in closed position on the latter.

Housed within the smaller of the compartments is a standard 32 having a socket 34 embedded in its top end to receive an electric lamp bulb 34' and a plug outlet 36, together with a toggle switch 38 embedded in the same below the socket 34, all in electrical connection with each other and with a conductor cord 40 leading outwardly through a side of the lower end portion of the standard, the plug outlet 36 having its resilient contacts 36' exposed through a side of the standard, other than the side through which the finger grip 38' of the toggle switch 38 projects. A hand grip 32' projects from the standard 32, above the finger grip 38' for use in raising the standard from its normally prone position within the smaller compartment into vertical position. The free end of the conductor cord 40 is provided with a plug connector 40' for engagement with an outlet, not shown, of an electric current source. In its upright position, the standard 32 can be moved along the smaller compartment to dispose the lamp 34' relative to the mirror M for desired illuminating effect.

Rising from the bottom wall 10 within the larger compartment is a series of posts 42, four in number, as shown, which are spaced apart and disposed in substantially close proximity to the front and side walls 12 and 14, of the case body and the forward side of the partition 20 for the training of the conductor cord 40 about the same when it is not in use, by which arrangement, a sufficient space is left within the convolutions of the conductor cord 40 for the reception of desired toilet accessories, the conductor cord, as it leads outwardly from the standard 32 can be passed forwardly through one or the other of a pair of vertical slots 20" spacedly formed in the partition 20, the slots opening through the top edge of the partition for the purpose depending upon which end of the smaller compartment is occupied by the standard at the moment.

If, for any reason, it is desired to separate the lid from the case body, it may be easily accomplished by prying and springing the forward lower corners of the side wall parts 14a inwardly to disengage openings 18 from lugs 18' and then lifting side parts 14a together with the lid, either entirely from the case body or high enough to allow the rear open ends of the channels 14d and the slots thereof, to clear the back wall 16 when the lid can be detached from the wall parts by a rearward sliding movement to free the headed elements 26' from the channels and slots.

As before stated, the plastic parts of the case are to be readily formed by the injection method of molding, or by any other suitable process and the plastic material employed may be either transparent, translucent or opaque, and of any color, as desired, and, as shown in Fig. 8, an opening 18'' is provided in the bottom wall 10 of the case body to facilitate the formation of the projecting or lug 18' on each of the side walls 14.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. In a toilet case, a hollow rectangular body having a bottom wall, a front wall, sidewalls, a back wall and an open top, a lid for said open top comprising an open frame formed of an upper part and a lower part, the edges of the opening in the upper part being rabbeted at the inner sides thereof to receive the edges of a mirror, a mirror carried by said lid and having its reflecting surface exposed at the top side thereof, a relatively narrow thickened portion formed on the inner side of said upper part and extending in slightly spaced parallel relation with respect to said opening, said thickened portion being grooved at its inner side edges for the engagement of the outer edges of said lower part therewith, said lower part acting to support said mirror in place within said opening, said lid being movable forwardly on said body and swingable into an upwardly disposed open position and means for holding said lid in open position.

2. In a toilet case, a hollow rectangular body having a bottom wall, a front wall, sidewalls, a back wall and an open top, a lid for said open top, a mirror carried by said lid and having its reflecting surface exposed at the top side thereof, a transverse partition in said body providing a large forward compartment and a smaller rear compartment, supplemental sidewall parts positioned against the inner sides of the rear end portion of the sidewalls of said body with their rear end edges abutted against said back wall, each of said wall parts having a horizontal slotted channel opening through the inner side and the rear end edge thereof, a circular headed element projecting laterally from each end of the rear lower edge of said lid for sliding and hinging movement in said channel, said wall parts being removably held in place against the sidewalls of said body by said partition, said lid being movable forwardly on said body and swingable into an upwardly disposed open position with the inner lower edge of said lid substantially in alignment with said partition when said lid is moved into forward position to uncover said smaller compartment and means to hold said lid in open position.

3. In a toilet case, a hollow rectangular body having a bottom wall, a front wall, sidewalls, a back wall and an open top, a lid for said open top, a mirror carried by said lid and having its reflecting surface exposed at the top side thereof, a transverse partition in said body providing a large forward compartment and a smaller rear compartment, supplemental sidewall parts positioned against the inner sides of the rear end portion of the sidewalls of said body with their rear end edges abutted against said back wall, each of said sidewall parts having a horizontal slotted channel opening through the inner side at the rear end edge thereof, means projecting laterally from each end of the rear lower edge of said lid for sliding and hinging movement in said channel, means for removably holding said wall parts against the sidewalls of said body, said lid being movable forwardly on said body and swingable into an upwardly disposed open position with the inner lower edge of said lid substantially in alignment with said partition when said lid is moved into forward position to uncover said smaller compartment and means to hold said lid in open position.

References Cited in the file of this patent

UNITED STATES PATENTS

| | | |
|---|---|---|
| 1,698,266 | Kirby | Jan. 8, 1929 |
| 1,930,244 | Lewinsohn | Oct. 10, 1933 |
| 2,006,603 | Nordmark | July 2, 1935 |
| 2,357,214 | McDole | Aug. 29, 1944 |
| 2,442,541 | Fox | June 1, 1948 |

FOREIGN PATENTS

| | | |
|---|---|---|
| 827,749 | France | May 3, 1938 |